United States Patent
Mancini et al.

[19]

[11] Patent Number: 6,065,243
[45] Date of Patent: *May 23, 2000

[54] TREE AND SHRUB STABILIZING DEVICE

[75] Inventors: James A. Mancini, P.O. Box 502, Springfield, N.J. 07081; John A. Ventimiglia, Long Valley, N.J.

[73] Assignee: James A. Mancini, Springfield, N.J.

[ * ] Notice: This patent is subject to a terminal disclaimer.

[21] Appl. No.: 09/212,522

[22] Filed: Dec. 16, 1998

[51] Int. Cl.[7] ................................................... A01C 11/00
[52] U.S. Cl. .................................... 47/42; 111/2; 248/351
[58] Field of Search .................................. 47/42, 43, 44, 47/46, 47, 76, 58.1; 232/39; 248/175, 156, 514; 256/48, 58; 40/645; 52/40, 154

[56] References Cited

U.S. PATENT DOCUMENTS

| | | |
|---|---|---|
| 350,281 | 10/1886 | Wrightman . |
| 535,887 | 3/1895 | Brown . |
| 606,558 | 6/1898 | Ketchum .................................. 52/154 |
| 1,377,832 | 5/1921 | Hanner . |
| 1,560,404 | 11/1925 | Brown . |
| 2,926,874 | 3/1960 | Hahn ....................................... 248/514 |
| 4,658,737 | 4/1987 | Weissberg .................................. 47/42 |
| 4,894,950 | 1/1990 | Yukio et al. . |
| 5,473,839 | 12/1995 | Stidham . |

FOREIGN PATENT DOCUMENTS 4008-580-A1  3/1990  Germany .

*Primary Examiner*—Francis T. Palo
*Attorney, Agent, or Firm*—Watov & Kipnes, P.C.; Kenneth Watov

[57] ABSTRACT

A device for securing the root ball of newly planted trees and/or shrubs into proper position, for stabilizing the trees and/or shrubs to prevent shifting or toppling while the tree and/or shrub root systems are first developing. The device includes a horizontal cross member, and a couple of prongs perpendicularly depending from the horizontal cross member. An outer prong is attached to one end of the cross member, and a shorter inner prong is attached to the other end of the cross member in one configuration. At the time of planting, after the root ball of the tree is set into an appropriate hole, and the tree is in proper position, the prongs of the device are driven into the ground such that the outer prong is retained in the firm portion of the soil, and the inner prong engages the root ball. The outer prong is of a sufficient length to be held securely in the soil, and the shorter prong is arranged both in position and sized in length to engage the root ball securely. The device is driven into the soil deep enough for the top of the cross member to be flush with the soil.

21 Claims, 6 Drawing Sheets

TREE AND SHRUB STABILIZING DEVICE

RELATED APPLICATION

This Application is related to co-pending Ser. No. 09/018,203, entitled TREE STAPLE, filed Feb. 3, 1998, and having common ownership herewith.

FIELD OF THE INVENTION

The present invention relates generally to devices for stabilizing newly planted trees and shrubs to prevent them from shifting or toppling while their root systems are first developing, and more particularly to devices to be used during planting, for securing the root balls of the newly planted trees or shrubs into proper position.

BACKGROUND OF THE INVENTION

Generally it is necessary to secure newly planted trees and shrubs in order to prevent them from shifting or toppling during the period before the planting's own root systems have developed sufficiently to provide stability. Shifting is particularly likely if large trees and shrubs are planted during wet or freezing weather. Newly planted shrubs or trees, which are subject to high winds may also be shifted out of position, or even toppled if not adequately supported. The period during which such support is beneficial to the planting may be significant depending on how quickly the root system develops.

Most conventional methods for providing support during the period when trees or large shrubs are first planted include driving two or more equally spaced stakes into the ground around the tree or large shrub and securing the trunk to the stakes with rope or wire. The stakes are usually wood for reasons of convenience and economy. The stakes may be in the form of short pegs that project only several inches from ground level, or may be in the form of posts that project several or more feet from ground level.

Conventional tree staking methods have several disadvantages. The stakes can be a dangerous hazard to people who may walk into, or trip on them. The stakes are difficult to mow and to trim around. The stakes and associated ropes or wires may work loose, and may require attention from time to time. The conventional methods of staking are unsightly. Once the root system is capable of supporting the plant on its own, the conventional tree staking method is no longer needed and should be removed, resulting in additional work and potentially an additional cost for professional nurserymen. Generally, the stakes deteriorate during the time they are in use, and cannot be used more than once, adding to the cost of the tree or shrub. Finally, the conventional methods are useful primarily with small to moderate sized trees and shrubs, and provide limited support for larger plantings.

For the foregoing reasons, there is a need for an improved device and method of installation, that can be installed at the time of planting, and that provides the required stabilization without the limitations of the conventional methods.

SUMMARY OF THE INVENTION

It is an object of this invention to provide a multi-pronged staple, of sufficient size to engage both the root ball and the surrounding undisturbed earth, that can provide stabilizing support for any size tree or shrub.

Another object of the invention is to provide a new planting stabilizing support without potentially hazardous ropes, wires, or stakes.

Another object of the invention is to provide a new planting stabilizing support system that is not difficult to mow and to trim around.

Another object of the invention is to provide a new planting stabilizing support that will not work loose over time, and requires little or no attention after installation.

Another object of the invention is to provide a new planting stabilizing support system that is not unsightly.

Yet another object of the invention is to provide a new planting stabilizing support system that after a period of time in which the planting becomes self-supporting, the stabilizing support system components deteriorate into the surrounding soil.

Another object of the invention is to provide a stabilizing support system that may be permanent, or may be removed and used again.

Another object of the invention is to provide a stabilizing support system concept that is applicable to small trees and shrubs, and equally applicable to larger plantings.

Another object of the invention is to provide a stabilizing support system that provides superior physical stabilization in comparison to conventional systems.

Another object of the invention is to provide a stabilizing support system that is comprised of materials which will benefit the planting and surrounding environment if left in the ground.

A further object of the invention is to provide a stabilizing support system that is quicker and easier to install than the conventional methods.

In one embodiment of the invention, with the problems of the prior art in mind, various objects of the invention are provided by a unique tree stabilizing device having a straight horizontal cross member, and two prongs perpendicularly depending from the ends of the horizontal cross member. The embodiment typically has an outer prong, attached to one end of the horizontal cross member, and an inner prong attached to the other end of the cross member.

In a second embodiment, the tree stabilizing device horizontal cross member may have a large radius of curvature concave to the ground, with the ends of the curved cross member attached to the sides of the inner and the outer prongs. In this embodiment, impact may be applied directly to the prong's upper end. Gusset plates, and arrowheads may be included in the second embodiment.

In a third embodiment of the invention, the tree stabilizing device outer prong is depending from the end of the curved horizontal cross member at an angle from the vertical towards the shorter inner prong. The inner prong remains perpendicular to the ends of the curved horizontal cross member. Gusset plates, and arrowheads may be included in this embodiment.

In all of the embodiments described, the tree stabilization devices may consist of material such as iron, steel, or other metal free of harmful platings or coatings. In applications where iron or steel tree stabilization devices are used, the iron oxide which forms as the devices oxidize over time, may be beneficial to the soil. Typically, an inexpensive material such as a reinforcement bar (rebar) is used. Other suitable materials may also be used. The primary method of construction is welded joints.

In all of the embodiments described, the tree stabilizing device is applied at the time of planting. After the root ball of the tree or shrub is set into an appropriate sized hole, the tree is positioned to the proper vertical position and correct orientation and the surrounding hole space is filled with soil, the tree stabilizing device is driven into the ground such that the outer prong engage the firm undisturbed portion of the soil beyond the hole, and the inner prong engage the root ball. The outer prong is of a sufficient length to be held permanently and securely into the earth, and the shorter inner prong is arranged both in position and length to engage the root ball securely. The tree stabilization device is typically driven into the earth deep enough so that the top most portion will be flush with the soil, thereby not becoming a tripping hazard, or being unsightly.

BRIEF DESCRIPTION OF THE DRAWINGS

The various embodiments of the invention are described in detail below with reference to the drawings, in which like items are identified by the same reference designation, wherein.

DETAILED DESCRIPTION OF THE DESCRIPTION

Figure 1:
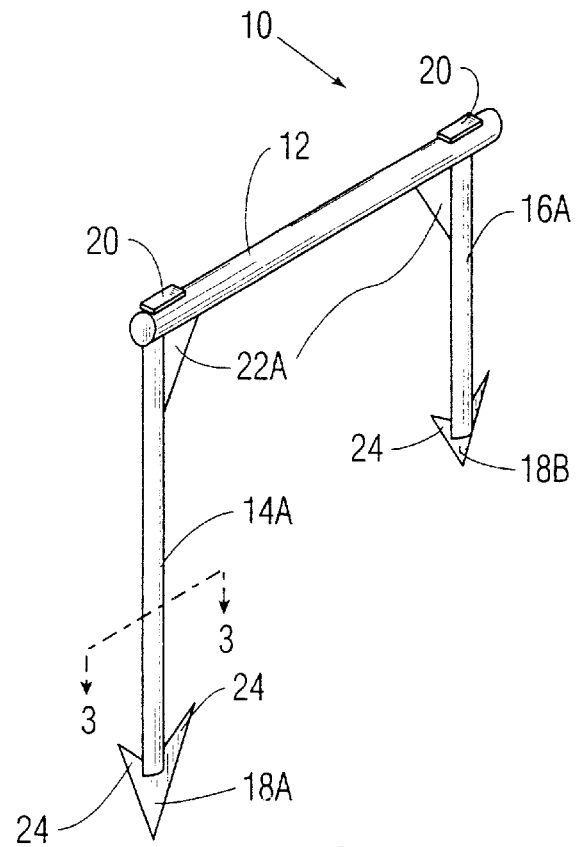
FIG. 1 is a pictorial view of one embodiment of the invention providing a tree stabilization device having an outer prong and a shorter inner prong, and a straight horizontal cross member.

FIG. 1 shows a preferred embodiment of tree stabilization device 10. The straight horizontal cross member 12 has an outer prong 14A attached to one end of cross member 12, and reinforced by triangular gusset plates 22A. The shorter inner prong 16A is attached to the other end of cross member 12. Triangular shaped arrowhead 18A, is attached to the lower end of outer prong 14A. Arrowhead 18B and is attached to the lower end of inner prong 16A. The horizontal cross member 12 has a flat impact surface 20 located directly above each of the prongs. Each of the arrowheads 18 has rear projecting barbs 24.

Typically, the tree stabilization devices 10 are driven into position by pounding them into the ground with mallets, sledge hammers or other appropriate sources of impact. Optionally, the horizontal cross member may have flat impact surfaces 20 on the top, directly above the points where the prongs are attached, to provide a surface where the impact is applied. By locating the impact surfaces 20 directly axially in line with the prongs, the impact is applied in the most efficient manner to drive the tree stabilization device 10 into position, with the least amount of distortion, or damage. It is preferable to locate the straight horizontal cross member 12 between the source of impact and the inner 18B and outer 18A prongs, so that the impulse applied during installation will not tend to break the welds.

Figure 2:
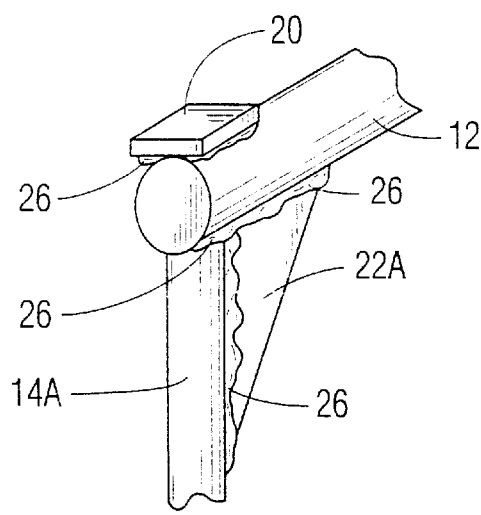
FIG. 2 illustrates a detailed view of the assembly of the tree stabilization device, where a prong attaches to the straight horizontal cross member.

In applications requiring tree stabilization devices of greater strength and stability, the perpendicular prong 14A is attached to the horizontal member with triangular reinforcements, typically known as gusset plates 22A. FIG. 2 illustrates a detailed view of the tree stabilization device assembly where outer prong 14A attaches to cross member 12. Typical welds 26 are shown where the impact surface 20, and the gusset plate 22A are connected to the cross member 12, and the prong 14A. The addition of the gusset plates 22A maintains the structural integrity of the device both during installation, and during its useful life, without detriment to performance. The outer prong 14A gusset plates 20 may also be sized appropriately to help anchor the root ball in place, thereby providing an additional source of stability for the tree or shrub.

Figure 3:
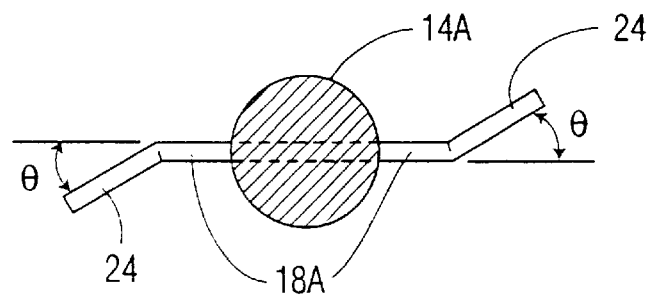
FIG. 3 illustrates a cross-sectional view taken along 3—3 of an outer prong showing the rear of a barbed arrowhead bent approximately thirty degrees off axis.
Figure 4:
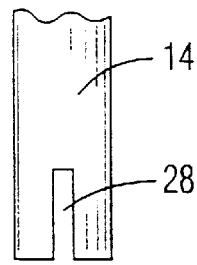
FIG. 4 shows a detail of the lower end of a prong having slots for receiving the arrowheads.
Figure 5:
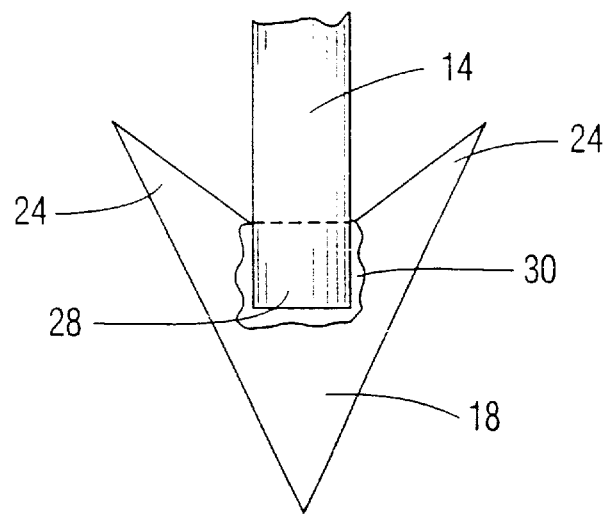
FIG. 5 shows a detail of a typical assembled arrowhead on an inner or outer prong.

In applications requiring enhanced tree stability, triangular shaped arrowheads, either with or without rear projecting barbs 24 are added. FIG. 3 illustrates the cross-sectional view 3—3, downward along outer prong 14A. Arrowhead 18A is viewed from the rear with barbs 24 bent approximately thirty degrees off axis, as indicated by the angle θ. As shown in the exploded view of FIG. 4, the lower end of prong 14 includes a slot 28 for receiving arrowhead 18. An enlarged view of a typical arrowhead 18 assembled on prong 14 is shown in FIG. 5. In this embodiment the arrowhead 18 is located within slot 28 and retained by weld 30. The addition of the triangular shaped barbed arrowheads 18, reduces the potential for the tree stabilization device to work loose. Bending the barbs 24 on each arrowhead 18 approximately thirty degrees from the vertical plane of the arrowhead provides a twisting bias during insertion and results in increased retention in the soil.

Figure 6:
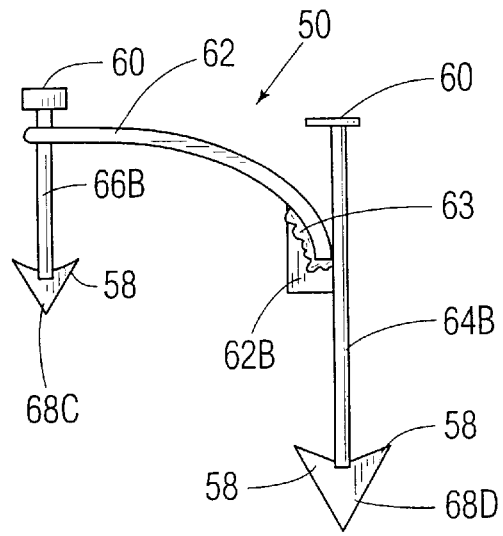
FIG. 6 shows an alternative embodiment of the tree stabilization device having a curved horizontal cross member, an outer prong, and a shorter inner prong.

In FIG. 6, an alternative embodiment of the invention, is provided by a tree stabilization device 50 that includes a curved horizontal cross member 62 with a large radius of curvature and an outer prong 64B attached to one end of cross member 62. The joint between the outer prong 64B and the cross member 62 is reinforced by rectangular gusset plates 62B and 62C, all of which are joined together by welds 63. The shorter inner prong 66B is attached the other end of cross member 62 via gasset plate 62D. Triangular shaped arrowhead 68D is attached to the lower end of outer prong 64B, and arrowhead 68C is attached to the lower end of inner prong 66B. Outer prong 64B and inner prong 66B each have flat impact surface plates 60 located at their respective top ends. Each of the arrowheads 68C and 68D has rear projecting barbs 58.

Figure 7:
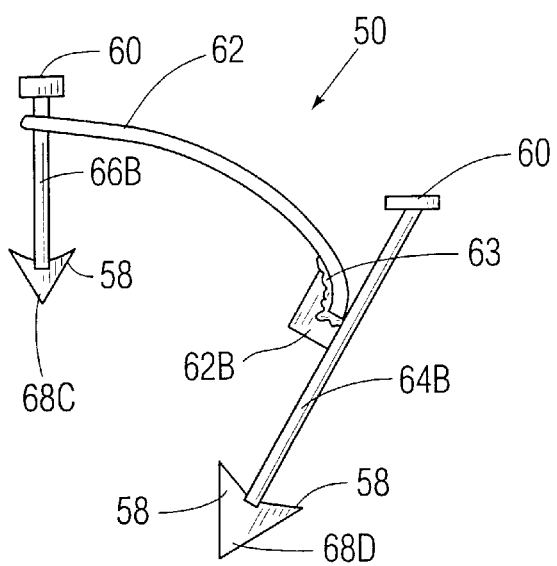
FIG. 7 shows a pictorial view of an alternative embodiment of a compound tree stabilization device having a curved horizontal cross member, a inner prong, and a longer outer prong, positioned at an angle to the vertical toward the shorter inner prong.

In FIG. 7, an alternative embodiment of the invention, is provided by a tree stabilization device 50 that includes a curved horizontal cross member 62. The only distinction between this embodiment and the embodiment of FIG. 6 is the position of outer prong 64B which is angled slightly from the vertical towards the inner prong 66B.

Figure 8:
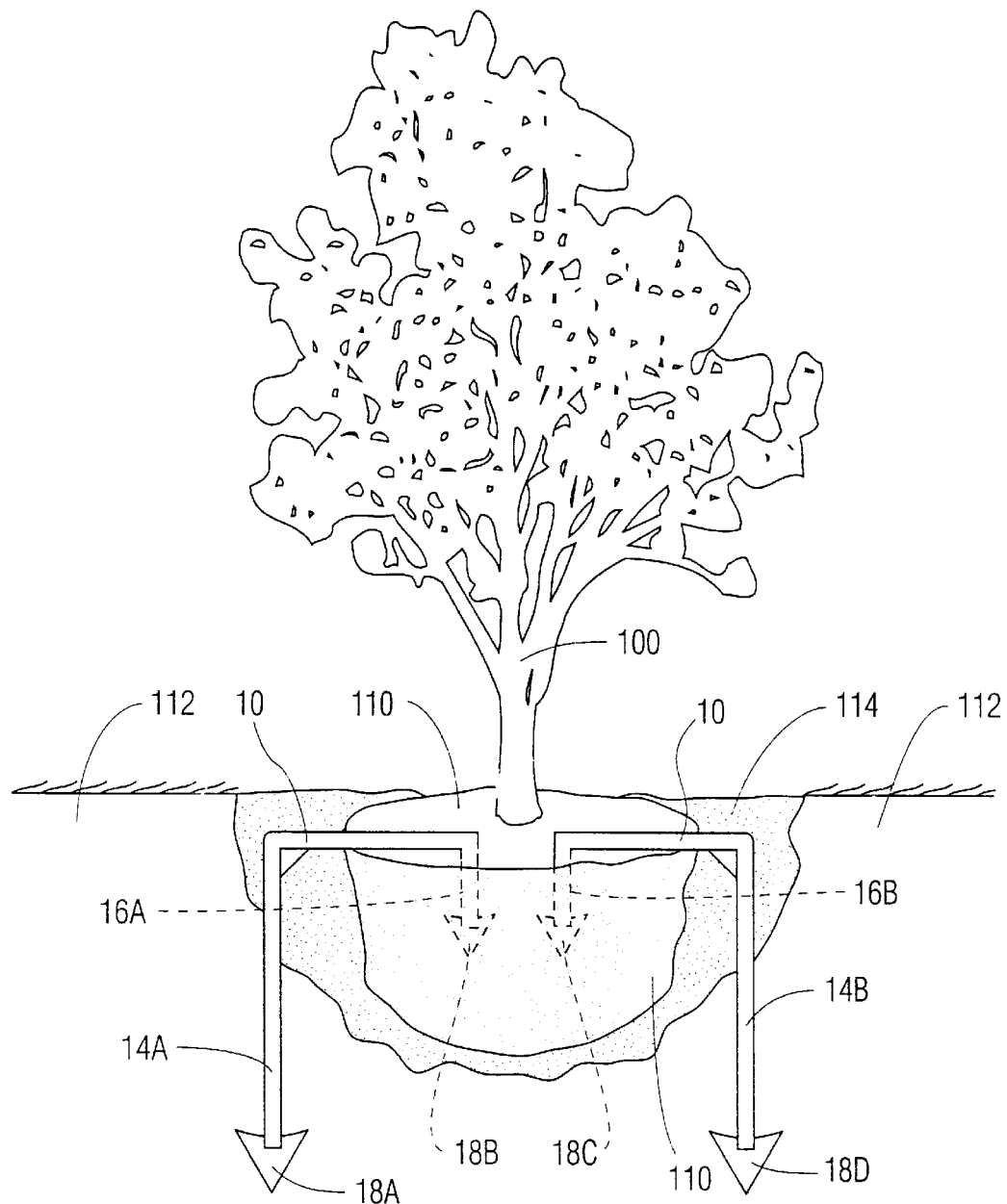
FIG. 8 shows a newly planted tree stabilized by a pair of the present tree stabilization devices.

In FIG. 8, two tree stabilization devices 10 are positioned for stabilizing a newly planted tree 100. The two inner prongs 16A and 16B penetrate the associated root ball 110. Arrowheads 18B and 18C are located substantially within root ball 110 for sufficient stability. The two outer prongs 14A and 14B extend through and beyond the fill dirt 114, and are engaged deep within the surrounding undisturbed soil 112, such that arrowheads 18A and 18D maintain the tree stabilization device 10 substantially in place.

Figure 9:
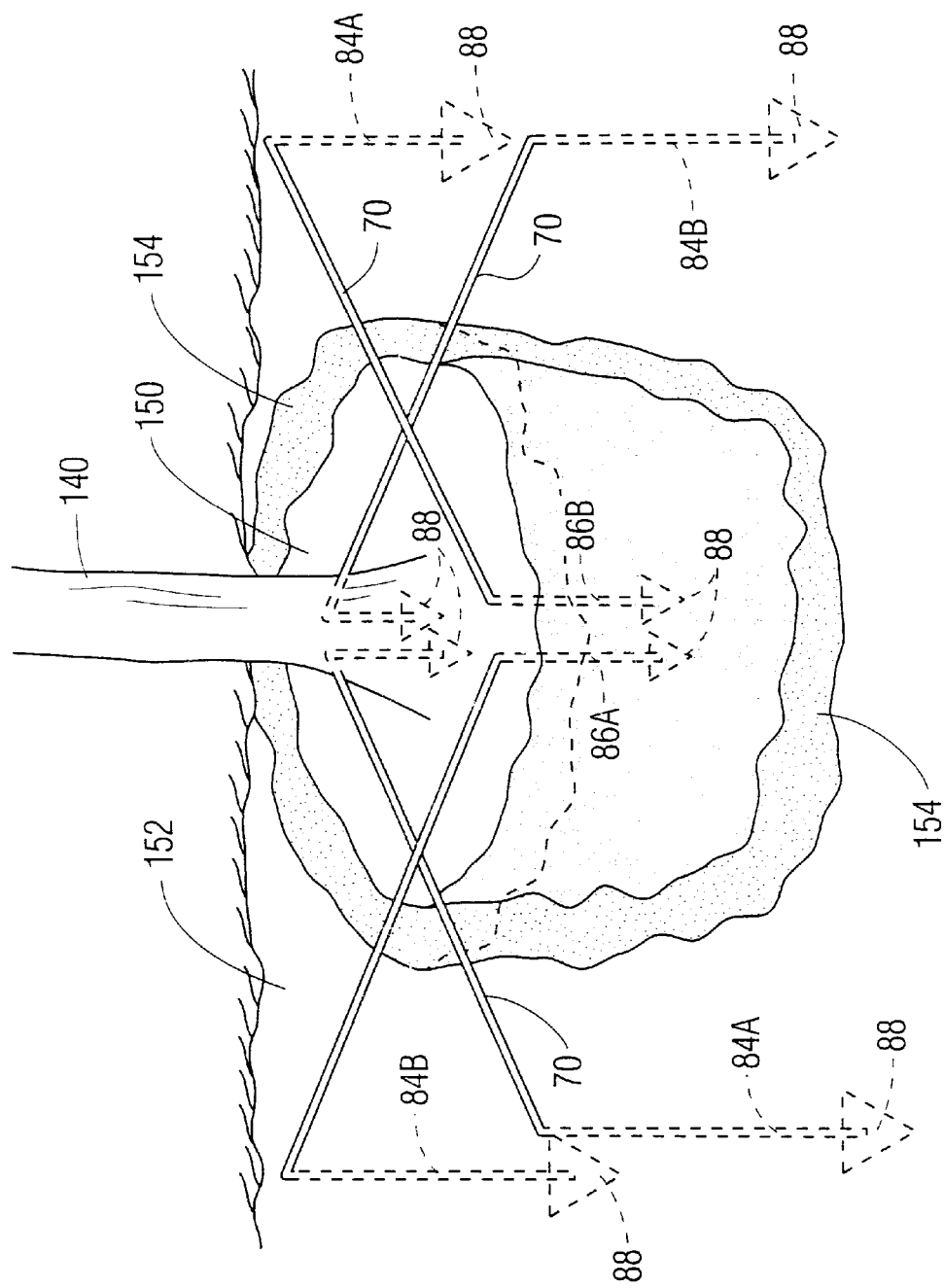
FIG. 9 shows a newly planted tree stabilized by four tree stabilization devices arranged in one of several application configurations.

Several tree stabilization devices may be employed to anchor the tree in its place and arranged radially around the tree or otherwise—one configuration is shown in FIG. 9. In FIG. 9, four tree stabilization devices 70 are used to secure a newly planted tree 140, having root ball 150. The root ball 150 is separated from undisturbed soil 152, by fill dirt 154. In each tree stabilization device 70, the outer prongs 84A and 84B extend beyond the fill dirt 154, and are retained within undisturbed soil 152, while inner prongs 86A and 86B, together with their arrowheads 88 are located substantially within root ball 150.

Figure 10:
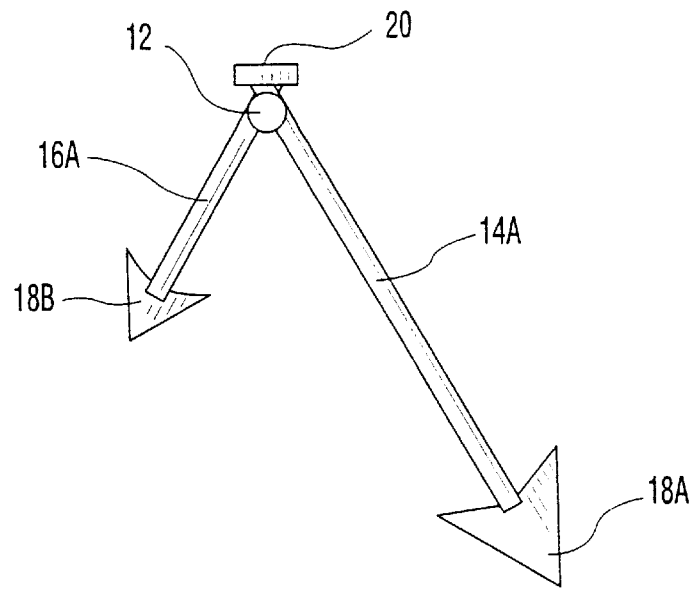
FIG. 10 illustrates an end view of an alternative embodiment of the invention along the axis of the horizontal cross member of the tree stabilization device, where the inner and outer prongs reside in different planes with respect to the axis of the horizontal cross member.
Figure 11:
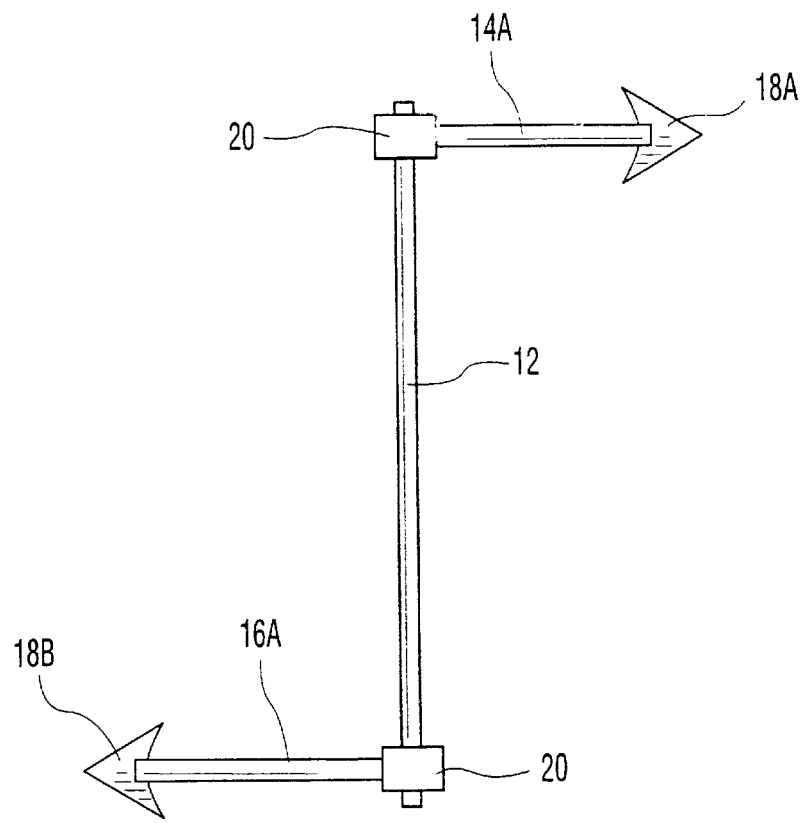
FIG. 11 shows a top view of an alternative embodiment of the tree stabilization device with the inner and outer prongs residing in the different planes.

Typically, the prongs 14A and 16A of the tree stabilization device 10 as shown in FIG. 1 are set in the same plane along the axis of horizontal cross member 12. FIG. 10 illustrates the end view of an alternative embodiment of the invention. The inner prong 16A and the outer prong 14A is viewed along axial line of the horizontal cross member 12. The shorter inner prong 16A is shown in the foreground and the longer outer prong 14A is located distally at the other end of the horizontal cross member 12. In this embodiment, the shorter inner prong 16A resides in a plane along the axial line of the horizontal cross member 12 different from the plane of the longer outer prong 14A. In FIG. 11, the top view of this embodiment is shown to further illustrate the positions of the inner and outer prongs relative to one another.

Although various embodiments of the invention have been shown and described, they are not meant to be limiting. Those of skill in the art may recognize various modifications to these embodiments, which modifications are meant to be covered by the spirit and scope of the appended claims.

What is claimed is:

1. A device for stabilizing a tree or shrub root ball in a hole, comprising:
    a central cross member having a first end and a second end;
    a first prong having a top end and a bottom end, said top end of said first prong joined to said central cross member first end;
    a second prong having a top end and a bottom end, said top end of said second prong joined to said central cross member second end; and
    wherein the length of said first prong is dimensioned to be firmly retained in undisturbed soil surrounding the hole, and the length of said second prong is dimensioned to firmly engage the root ball.

2. The device of claim 1, wherein said central cross member has a straight rod-like structure.

3. The device of claim 1, wherein said central cross member having a large radius of curvature concave relative to the ground.

4. The device of claim 1, wherein said first prong is longer in length than the second prong.

5. The device of claim 1, wherein said first and second prongs lying in the same plane.

6. The device of claim 1, wherein said first and second prongs are lying in different planes.

7. The device of claim 1, wherein said first and second prongs are parallel to one another.

8. The device of claim 1, wherein said first prong depends from the end of the central cross member at an angle towards said second prong.

9. The device of claim 1, further including arrowheads affixed to the bottom ends of each prong.

10. The device of claim 1, wherein gusset plates are rigidly secured at the joints of said first and second prongs and said central cross member.

11. The device of claim 1, wherein said central cross member has a top surface, a pair of flat impact surfaces disposed upon said top surface, and each of said impact surfaces being located directly above and centered on the axis of said first and second prongs.

12. The device of claim 1, wherein said cross member, and first and second prongs consist of metal material.

13. The device of claim 3, wherein said first prong is longer in length than said second prong.

14. The device of claim 12, wherein said metal material is a ferrous metal.

15. The device of claim 14, wherein the ferrous metal is reinforcing bar.

16. The device of claim 15, wherein said first and second prongs, and said central cross member are affixed by welds.

17. A method for stabilizing a newly planted tree or shrub comprising the steps of:
    forming a device for stabilizing a tree or shrub root ball including:
        a central cross member having a first end and a second end;
        a first prong having a top end and a bottom end, said top end of said first prong joined to said central cross member first end; and
        a second prong having a top end and a bottom end, said top end of said second prong joined to said central cross member second end, said second prong being shorter than said first prong;
    digging a hole in the ground large enough to accept the root ball of said tree or shrub;
    placing the root ball into the hole, and positioning the tree or shrub in a desired orientation;
    filling the space between the root ball and the ground with fill dirt;
    positioning at least one said device such that the longer perpendicular projecting first prong attached at one end of the central cross member impinges the undisturbed soil, while the other perpendicular projecting second prong is directly above the root ball and oriented to impinge as much of the root ball as possible
    driving the longer first prong of the device into the undisturbed soil beyond the root ball, and the shorter second prong into the root ball until the central cross member, and all other projections from the device are flush with the ground level.

18. The method of claim 17, wherein the forming device step further includes:
    said first and second prongs lying in the same plane.

19. The method of claim 17, wherein the forming device step further includes:
    said first and second prongs lying in different planes.

20. The device of claim 9, wherein said arrowheads are affixed by welds.

21. The device of claim 10, wherein said gusset plates are affixed by welds.

* * * * *